US009398374B2

(12) United States Patent
Lashkari et al.

(10) Patent No.: US 9,398,374 B2
(45) Date of Patent: Jul. 19, 2016

(54) SYSTEMS AND METHODS FOR NONLINEAR ECHO CANCELLATION

(71) Applicant: Cirrus Logic, Inc., Austin, TX (US)

(72) Inventors: Khosrow Lashkari, Palo Alto, CA (US); Jie Su, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 94 days.

(21) Appl. No.: 14/457,284

(22) Filed: Aug. 12, 2014

(65) Prior Publication Data

US 2016/0050489 A1  Feb. 18, 2016

(51) Int. Cl.
  *H04B 3/00* (2006.01)
  *H04R 3/00* (2006.01)
  *H04R 3/02* (2006.01)
(52) U.S. Cl.
  CPC ... *H04R 3/00* (2013.01); *H04R 3/02* (2013.01)
(58) Field of Classification Search
  None
  See application file for complete search history.

(56) References Cited

U.S. PATENT DOCUMENTS

| 7,873,172 B2 | 1/2011 | Lashkari |
| 8,204,210 B2 | 6/2012 | van de Laar |
| 8,462,958 B2 * | 6/2013 | Kuech et al. ............... 381/66 |
| 8,538,008 B2 | 9/2013 | Suppappola |
| 2009/0119111 A1 * | 5/2009 | Goto et al. ............... 704/500 |
| 2010/0128868 A1 | 5/2010 | Suppappola |
| 2011/0261949 A1 * | 10/2011 | Dyba et al. ............... 379/406.08 |
| 2014/0254804 A1 | 9/2014 | Su |

FOREIGN PATENT DOCUMENTS

| WO | 9626624 A1 | 8/1996 |
| WO | 2013182901 A1 | 12/2013 |

OTHER PUBLICATIONS

International Search Report and Written Opinion, International Patent Application No. PCT/US2015/043456, mailed Sep. 30, 2015, 13 pages.
Ngia, Lester S. H. and Sjoberg, Jonas; Nonlinear Acoustic Echo Cancellation Using a Hammerstein Model, Acoustics, Speech and Signal Processing, 1998, Proceedings of the 1998 IEEE International Conference, vol. 2, May 12, 1998, pp. 1229-1232.
Klippel, W., Active compensation of Transducer Nonlinearities, AES 23rd International Conference, May 23, 2003, pp. 1-17.

* cited by examiner

*Primary Examiner* — Muhammad N Edun
(74) *Attorney, Agent, or Firm* — Jackson Walker L.L.P.

(57) ABSTRACT

In accordance with embodiments of the present disclosure, an audio processing circuit for use in an audio device may perform non-linear acoustic echo cancellation by predicting a displacement associated with an audio speaker, wherein such prediction takes into account a nonlinear response of the audio speaker with a mathematical model that calculates the predicted displacement of the audio speaker as a function of a current signal associated with the audio speaker using a time-varying difference equation, wherein coefficients of the difference equation are based on a set of physical parameters of the audio speaker. From the predicted displacement, the processing circuit may calculate a predicted acoustic output of the audio speaker, which may be used to generate a reference signal to an acoustic echo canceller.

16 Claims, 3 Drawing Sheets

SYSTEMS AND METHODS FOR NONLINEAR ECHO CANCELLATION

FIELD OF DISCLOSURE

The present disclosure relates in general to circuits for audio devices, including without limitation telephones, and more specifically, to systems and methods for cancelling an echo reflected from a speaker to a microphone in such audio input devices.

BACKGROUND

The sound from a loudspeaker can be reflected or coupled back to a microphone after some finite delay, producing an echo. Many modern audio devices include circuits known as acoustic echo cancelers, for reducing or eliminating the effects of such echoes. In an ideal case, the echo corresponds to the electrical signal causing the loudspeaker to generate the sound and the audio device (including loudspeaker, enclosure, and microphone) may be assumed to have a linear response to such electrical signal. However, in reality, most audio transducers, such as microphones and loudspeakers, and components used in devices including microphones and loudspeakers (e.g., power amplifiers used to drive loudspeakers) are nonlinear, even when operated in their optimum operating ranges.

These nonlinear effects may significantly reduce the performance of acoustic echo cancelers, particularly in mobile phones and hands-free kits for mobile phones, as such devices may often use inexpensive, low-quality loudspeakers that may be poorly isolated from the remainder of the audio device. When such a loudspeaker is overdriven, saturation effects associated with the loudspeaker and its amplifier distort sound in a nonlinear manner. An acoustic echo of such sound contains a mixture of linear and nonlinear components. A typical acoustic echo canceler estimates only the linear acoustic impulse response of the loudspeaker-enclosure-microphone system. The remaining nonlinear components can be large and audible, particularly at high volumes.

Several approaches have been used to cancel the nonlinear echo. One approach is nonlinear preprocessing of the signal to the loudspeaker. This method attempts to compensate for known nonlinear characteristics. Such predistortion can degrade the quality of speech or loudness from a loudspeaker. Another approach is to use a nonlinear adaptive filter. Most or all known techniques of using an adaptive filter to reduce echo have high computational cost and converge slowly, which may render them unsuitable for most real-time applications.

SUMMARY

In accordance with the teachings of the present disclosure, the disadvantages and problems associated with audio transducer nonlinearities in performing echo cancellation in an audio device have been reduced or eliminated.

In accordance with embodiments of the present disclosure, an apparatus for non-linear acoustic echo cancellation may include a current signal input, a processing circuit, and a reference signal output. The current signal input may be configured to receive a current signal indicative of an electrical current associated with the audio speaker. The processing circuit may be configured to calculate a predicted displacement associated with an audio speaker including a nonlinear response of the audio speaker with a mathematical model which calculates predicted displacement of the audio speaker as a function of the current signal and a time-varying difference equation, wherein coefficients of the difference equation are based on a set of physical parameters of the audio speaker, and calculate a predicted acoustic output of the audio speaker based on the predicted displacement. The reference signal output may be configured to generate a reference signal to an acoustic echo canceller, wherein the reference signal is indicative of the predicted acoustic output of the audio speaker.

In accordance with these and other embodiments of the present disclosure, a method for non-linear acoustic echo cancellation may include receiving a current signal indicative of an electrical current associated with an audio speaker. The method may also include calculating a predicted displacement associated with an audio speaker including a nonlinear response of the audio speaker with a mathematical model which calculates predicted displacement of the audio speaker as a function of the current signal using a time-varying difference equation, wherein coefficients of the difference equation are based on a set of physical parameters of the audio speaker. The method may further include calculating a predicted acoustic output of the audio speaker based on the predicted displacement. The method may additionally include generating a reference signal to an acoustic echo canceller, wherein the reference signal is indicative of the predicted acoustic output of the audio speaker.

In accordance with these and other embodiments of the present disclosure, an audio device may include an audio speaker configured to generate audio sounds, a microphone configured to capture audio sounds, a processing circuit, and an acoustic echo canceller. The processing circuit may be coupled to the audio speaker and may have a current signal input configured to receive a current signal indicative of an electrical current associated with the audio speaker and a reference signal output. The processing circuit may be configured to calculate a predicted displacement associated with an audio speaker including a nonlinear response of the audio speaker with a mathematical model which calculates predicted displacement of the audio speaker as a function of the current signal and a time-varying difference equation, wherein coefficients of the difference equation are based on a set of physical parameters of the audio speaker. The processing circuit may also be configured to calculate a predicted acoustic output of the audio speaker based on the predicted displacement and generate the reference signal to the reference signal output, wherein the reference signal is indicative of the predicted acoustic output of the audio speaker. The acoustic echo canceller may be coupled to the processing circuit and configured to, based on the reference signal, cancel a portion of the audio sounds received by the microphone corresponding to echoes of the audio sounds generated by the audio speaker.

In accordance with these and other embodiments of the present disclosure, an article of manufacture may include a non-transitory computer readable medium and computer-executable instructions carried on the computer readable medium, wherein the instructions are readable by a processor. The instructions, when read and executed, may cause the processor to: (i) receive a current signal indicative of an electrical current associated with an audio speaker; (ii) calculate a predicted displacement associated with the audio speaker including a nonlinear response of the audio speaker with a mathematical model which calculates predicted displacement of the audio speaker as a function of the current signal using a time-varying difference equation, wherein coefficients of the difference equation are based on a set of physical parameters of the audio speaker; (iii) calculate a predicted acoustic output of the audio speaker based on the predicted displacement; and (iv) generate a reference signal to an acoustic echo canceller, wherein the reference signal is indicative of the predicted acoustic output of the audio speaker.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are exemplary and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
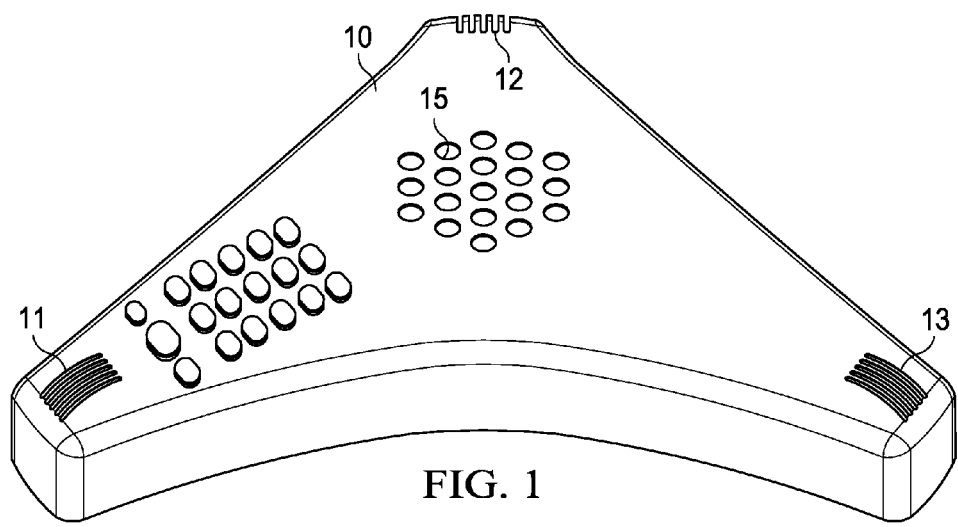
FIG. 1 is an illustration of an example communication device having an echo cancellation system that may implement embodiments of the present disclosure.

FIG. 1 is an illustration of an example communication device 10 having an echo cancellation system that may implement embodiments of the present disclosure. Communication device 10 may be a conference phone or speaker phone such as found in business offices, homes, and other locations. Communication device 10 may include a plurality of microphones 11, 12, 13, and a speaker 15 in a sculptured case.

Figure 2:
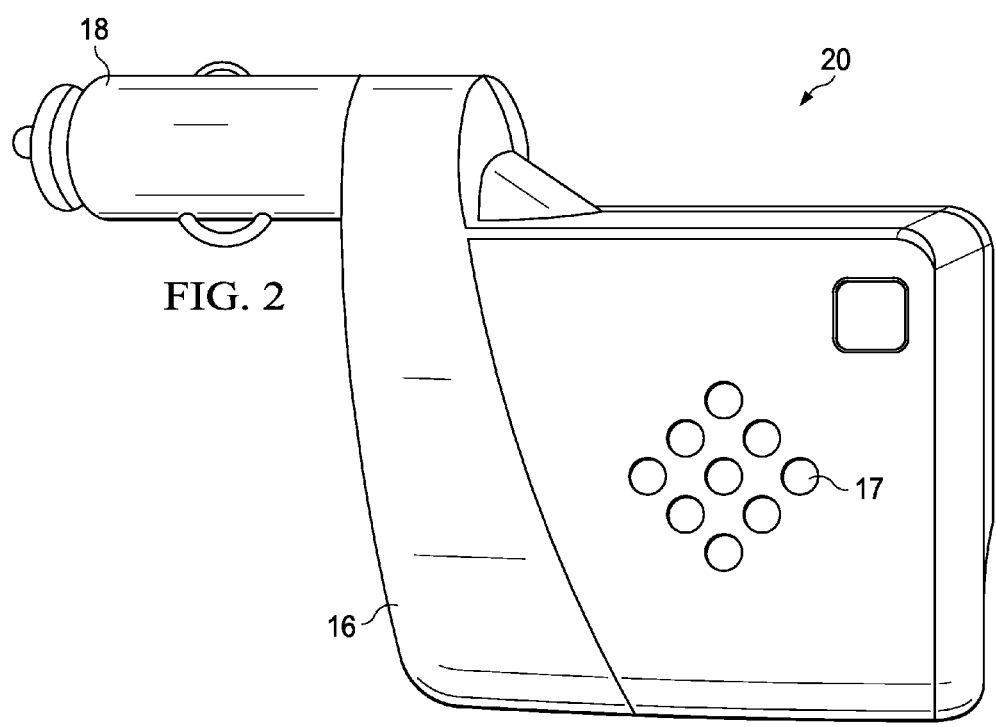
FIG. 2 is an illustration of an example hands-free kit having an echo cancellation system that may implement embodiments of the present disclosure.

FIG. 2 is an illustration of an example hands-free kit 20 having an echo cancellation system that may implement embodiments of the present disclosure. Hands-free kit 20 may provide audio coupling to a cellular telephone, such as mobile phone 22 depicted in FIG. 3. Hands-free kits come in a variety of implementations but generally include a case 16, a powered speaker 17 and a plug 18, which may couple to an accessory electrical power outlet or a cigarette lighter socket in a vehicle. Case 16 may contain more than one microphone or one of the microphones (not shown) may be separate and may plug into case 16. The external microphone may be for placement as close to a user as possible, e.g., clipped to a visor in a vehicle. For example, hands-free kit 20 may also include a cable for connection to a cellular telephone or have a wireless connection, such as a BLUETOOTH® interface. A hands-free kit in the form of a head set may be powered by internal batteries but may be electrically similar to the apparatus illustrated in FIG. 2.

Figure 3:
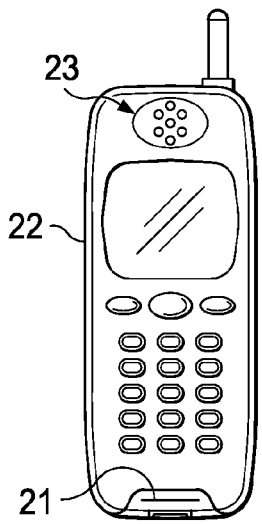
FIG. 3 is an illustration of an example mobile telephone having an echo cancellation system that may implement embodiments of the present disclosure.

FIG. 3 is an illustration of an example mobile telephone 22 having an echo cancellation system that may implement embodiments of the present disclosure. Mobile telephones 22 may come in a variety of implementations but generally include a microphone 21 for capturing sounds (e.g., voice of a user) and a powered speaker 23 for generating sounds.

In addition to those devices disclosed above, the systems and methods herein may also be used with and applied to computers, smart phones, tablets, and/or any other device that may be used as a communication device.

Figure 4:
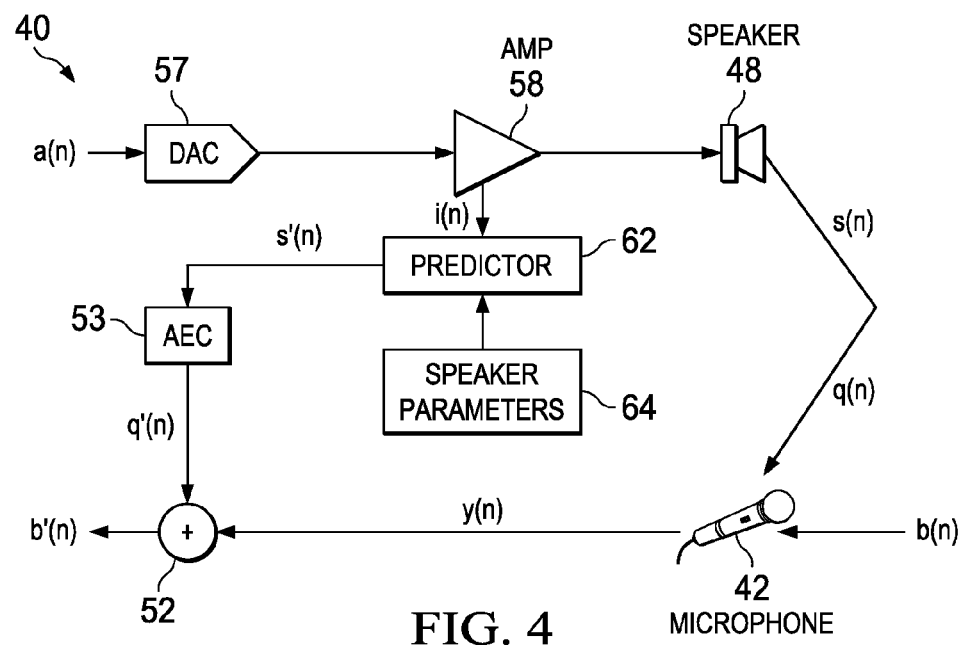
FIG. 4 is an illustration of a block diagram of an example audio processing circuit, in accordance with embodiments of the present disclosure.

FIG. 4 is an illustration of a block diagram of selected components of an example audio processing circuit 40, in accordance with embodiments of the present disclosure. Audio processing circuit 40, or circuits similar in design and functionality thereto, may be used within one or more of communication device 10, hands-free device 20, and mobile telephone 22, and/or with other audio devices, in order to provide acoustic echo cancellation functionality to such a device. As shown in FIG. 4, an audio output signal $a(n)$ may be received by audio processing circuit 40. In some embodiments, such audio output signal $a(n)$ may represent speech from a party conducting a two-way communication with a user of the audio device including audio processing circuit 40. Thus, such audio output signal $a(n)$ may include or be derived from a radio transmission received by the audio device including audio processing circuit 40. After receipt by audio processing circuit 40, audio output signal $a(n)$ may be converted from a digital signal to an analog signal by a digital-to-analog converter (DAC) 57, and then amplified by amplifier 58 for transmission to speaker 48, which may generate acoustic sounds represented by $s(n)$ based on the amplified audio signal received from amplifier 58.

As indicated by the line between speaker 48 and microphone 42, some of the sound from speaker 48 may be reflected back to microphone 42 as an echo, represented by $q(n)$. Accordingly, microphone 42 may capture both the echo $q(n)$ and desired speech $b(n)$, thus generating a microphone signal $y(n)$ such that $y(n)=b(n)+q(n)$.

To reduce or eliminate the echo $q(n)$ from microphone signal $y(n)$, audio processing circuit 40 may include an acoustic echo canceler (AEC) 53 configured to, based on a reference signal which is an estimated loudspeaker audio output $s'(n)$ of speaker 48, estimate the echo $q(n)$ in order to generate an estimated echo signal $q'(n)$. The estimated echo signal $q'(n)$ generated by AEC 53 may be subtracted from microphone signal $y(n)$, thus producing an estimated desired speech signal $b'(n)$ that approximates desired speech $b(n)$. Generation of an estimated echo signal $q'(n)$ from a reference signal by an acoustic echo canceler is beyond the scope of this disclosure, and techniques for generating such estimate echo signal are known by those skilled in the relevant art.

As shown in FIG. 4, audio processing circuit 40 may comprise a predictor 62 configured to, based on a current $i(n)$ associated with speaker 48 (e.g., a current of a voice coil of speaker 48) and based on one or more physical parameters 64 (e.g., force factor, a mechanical stiffness, an electrical inductance, a reluctance force factor, an effective mass, and a mechanical resistance of the audio speaker) associated with speaker 48, model linear and non-linear responses of speaker 48 to an audio output signal $a(n)$ in order to generate estimated loudspeaker audio output signal $s'(n)$. The functionality of predictor 62 is described in greater detail with respect to FIG. 5 below.

Figure 5:
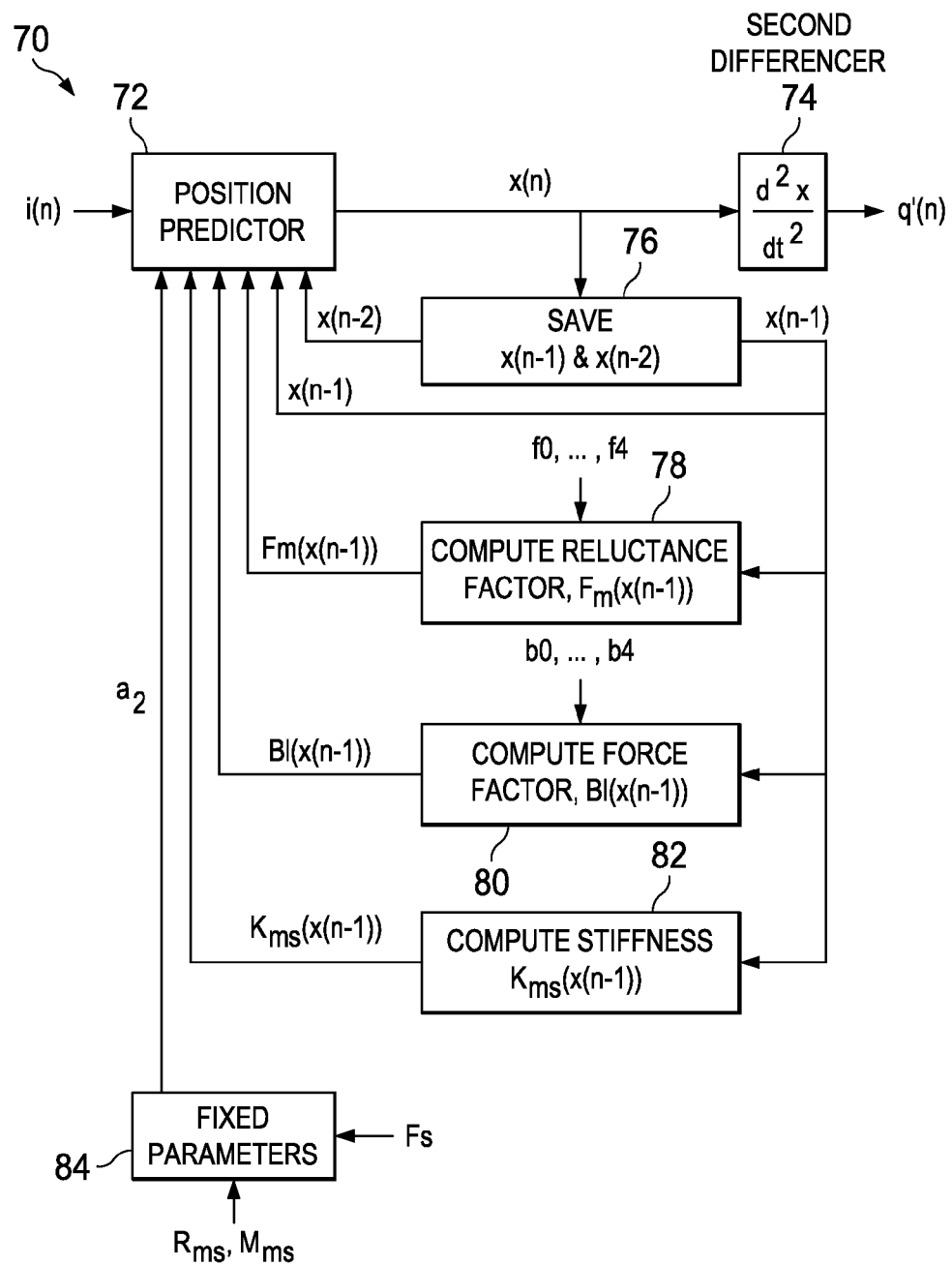
FIG. 5 is an illustration of a flow chart of an example method for predicting a displacement associated with an audio speaker and predicting an estimated audio signal, in accordance with embodiments of the present disclosure.

FIG. 5 is an illustration of a flow chart 70 of an example method for predicting a displacement $x(n)$ associated with speaker 48 and an estimated loudspeaker audio output signal $s'(n)$ generated by speaker 48, in accordance with embodiments of the present disclosure. In some embodiments, the method depicted in FIG. 5 may be performed by predictor 62. In these and other embodiments, the method depicted in FIG. 5 may be implemented partially or fully in software and/or firmware embodied in computer-readable media.

Using the method shown in FIG. 5, predictor 62 may generate a pre-distorted estimated loudspeaker audio output signal s'(n), pre-distorted in that it predicts non-linear distortion that may be present in speaker 48 and other components of audio processing system 40 before such distortion actually occurs. Predictor 62 may implement a position predictor block 72 that predicts a displacement x(n) associated with speaker 48 (e.g., a displacement of a voice coil of speaker 48) based on a measured current i(n) (e.g., a current delivered to speaker 48) and physical parameters modeling behavior of speaker 48. Such physical parameters may include fixed (e.g., not time-varying) parameters of speaker 48 which may be represented by a constant $a_2$ (block 84), previous displacement values x(n−1) and x(n−2) associated with speaker 48 (block 76), a time-varying force factor Bl(x) associated with speaker 48 (block 80), a time-varying mechanical stiffness $K_{ms}(x)$ associated with speaker 48 (block 82), and a time-varying reluctance factor $F_m(x)$ associated with speaker 48 (block 78). The constant $a_2$ may be calculated based on a mass $M_{ms}$ and mechanical resistance $R_{ms}$ associated with speaker 48 and the sampling frequency $F_s$ of the audio processing circuit 40. For example, the constant $a_2$ may be calculated by:

$$a_2 = \frac{M_{ms}F_s^2}{M_{ms}F_s^2 + R_{ms}F_s} = \frac{1}{1 + R_{ms}/(M_{ms}F_s)}$$

Each of force factor Bl(x), mechanical stiffness $K_{ms}(x)$, and reluctance factor $F_m(x)$ may be calculated as a function of displacement x using a Taylor series of any suitable order. In certain embodiments, a fourth-order Taylor series may be employed for each of such parameters. For example, force factor Bl(x) may be calculated by:

$$Bl(x(n)) = b_0 + b_1 x(n) + b_2 x^2(n) + b_3 x^3(n) + b_4 x^4(n)$$

where $b_0$, $b_1$, $b_2$, $b_3$, and $b_4$ may respectively comprise the zeroth-, first-, second-, third-, and fourth-order coefficients of expansion of the Taylor series for the force factor. Similarly, mechanical stiffness $K_{ms}(x)$ may be calculated by:

$$K_{ms}(x(n)) = k_0 + k_1 x(n) + k_2 x^2(n) + k_3 x^3(n) + k_4 x^4(n)$$

where $k_0$, $k_1$, $k_2$, $k_3$, and $k_4$ may respectively comprise the zeroth-, first-, second-, third-, and fourth-order coefficients of expansion of the Taylor series for the mechanical stiffness. In addition, reluctance factor $F_m(x)$ may be calculated by:

$$F_m(x(n)) = 0.5 \frac{dL_e(x)}{dx} = 0.5 f_1 + f_2 x(n) + 1.5 f_3 x^2(n) + 2 f_4 x^3(n)$$

where $f_0$, $f_1$, $f_2$, $f_3$, and $f_4$ may respectively comprise the zeroth-, first-, second-, third-, and fourth-order coefficients of expansion of the Taylor series for an electrical inductance associated with speaker 48, and where $L_e(x)$ is an electrical inductance associated with speaker 48 and may be calculated by:

$$L_e(x(n)) = f_0 + f_1 x(n) + f_2 x^2(n) + f_3 x^3(n) + f_4 x^4(n)$$

Each of the Taylor series expansion coefficients used may be determined based on testing or characterization of speaker 48 and/or speakers similar to speaker 48. These time-varying parameters for force factor Bl(x), mechanical stiffness $K_{ms}(x)$, and reluctance factor $F_m(x)$ may be used in computing coefficients of a second-order time-varying difference equation to predict displacement x(n). However, because predictor 62 is estimating displacement x(n) at time n, values of Bl(x), mechanical stiffness $K_{ms}(x)$, and reluctance factor $F_m(x)$ at time n will not yet be known. Accordingly, a past displacement (e.g., at time n−1) may be used to calculate the time-varying parameters. For example, displacement x(n) may be calculated based on a present value of current i(n) and the past two values of displacement x(n−1) and x(n−2) using the second-order difference equation:

$$x(n) = \left[ \frac{F_m(x(n-1))i^2(n) + Bl(x(n-1))i(n) - K_{ms}(x(n-1))x(n-1)}{M_{ms}F_s^2 + R_{ms}F_s} \right] + (1 + a_2)x(n-1) - a_2 x(n-2)$$

The equation above calculates displacement x(n) based on the known dependence of displacement x(n) on Lorenz force (Bl(x)), mechanical stiffness force ($K_{ms}(x)$), reluctance force ($F_m(x)$), current, and other parameters of speaker 48.

The acoustic output of speaker 48 may be proportional to the acceleration of the displacement associated with of speaker 48 (e.g., acceleration of a voice coil of with speaker 48). Because acceleration is the second derivative of displacement, predictor 62 may implement a second differencer 74 to calculate a second-order derivative of displacement x(n) to generate estimated loudspeaker audio output signal s'(n).

In some embodiments, a computer-readable medium (e.g., memory integral to or accessible by predictor 62) may be used to store the various constant physical parameters (e.g., mass, mechanical resistance and the coefficients of Taylor expansions for stiffness, force factor, electrical inductance, and previous displacement values) for modeling speaker 48.

This disclosure is described in the context of the acoustic echo in telephones but may be more broadly useful to audio devices other than telephones.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An apparatus for non-linear acoustic echo cancellation, comprising:
 a current signal input configured to receive a current signal indicative of an electrical current associated with an audio speaker;
 a processing circuit configured to:
  calculate a predicted displacement associated with the audio speaker including a nonlinear response of the audio speaker with a mathematical model which calculates predicted displacement of the audio speaker as a function of the current signal using a time-varying difference equation, wherein coefficients of the difference equation are based on a set of physical parameters of the audio speaker;
  calculate a predicted acoustic output of the audio speaker based on the predicted displacement; and
  generate a reference signal to an acoustic echo canceller, wherein the reference signal is equivalent to the predicted acoustic output of the audio speaker.

2. The apparatus of claim 1, wherein the set of physical parameters includes at least one of a force factor, a mechanical stiffness, an electrical inductance, a reluctance force factor, an effective mass, and a mechanical resistance of the audio speaker.

3. The apparatus of claim 1, wherein the mathematical model comprises a second-order difference equation as a function of the current signal.

4. The apparatus of claim 1, wherein the difference equation is given by:

$$x(n) = \left[\frac{F_m(x(n-1))i^2(n) + Bl(x(n-1))i(n) - K_{ms}(x(n-1))x(n-1)}{M_{ms}F_s^2 + R_{ms}F_s}\right] +$$
$$(1 + a_2)x(n-1) - a_2 x(n-2)$$

wherein x(n) is the predicted displacement at a discrete time n, i(n) is the current at a discrete time n, $F_m(x)$ is a reluctance force factor associated with the audio speaker at displacement x, $Bl(x)$ is a force factor associated with the audio speaker at displacement x, $K_{ms}(x)$ is a stiffness associated with the audio speaker at displacement x, and $a_2$ is a constant given by:

$$a_2 = \frac{M_{ms}F_s^2}{M_{ms}F_s^2 + R_{ms}F_s} = \frac{1}{1 + R_{ms}/(M_{ms}F_s)}$$

where $M_{ms}$ is the effective mass associated with the audio speaker, $R_{ms}$ is a mechanical resistance associated with the audio speaker, and $F_s$ is the sampling frequency at which the current is sampled.

5. A method for non-linear acoustic echo cancellation, comprising:
 receiving a current signal indicative of an electrical current associated with an audio speaker;
 calculating a predicted displacement associated with the audio speaker including a nonlinear response of the audio speaker with a mathematical model which calculates predicted displacement of the audio speaker as a function of the current signal using a time-varying difference equation, wherein coefficients of the difference equation are based on a set of physical parameters of the audio speaker;
 calculating a predicted acoustic output of the audio speaker based on the predicted displacement; and
 generating a reference signal to an acoustic echo canceller, wherein the reference signal is equivalent to the predicted acoustic output of the audio speaker.

6. The method of claim 5, wherein the set of physical parameters includes at least one of a force factor, a mechanical stiffness, an electrical inductance, a reluctance force factor, an effective mass, and a mechanical resistance of the audio speaker.

7. The method of claim 5, wherein the mathematical model comprises a second-order difference equation as a function of the current signal.

8. The method of claim 5, wherein the difference equation is given by:

$$x(n) = \left[\frac{F_m(x(n-1))i^2(n) + Bl(x(n-1))i(n) - K_{ms}(x(n-1))x(n-1)}{M_{ms}F_s^2 + R_{ms}F_s}\right] +$$
$$(1 + a_2)x(n-1) - a_2 x(n-2)$$

wherein x(n) is the predicted displacement at a discrete time n, i(n) is the current at a discrete time n, $F_m(x)$ is a reluctance force factor associated with the audio speaker at displacement x, $Bl(x)$ is a force factor associated with the audio speaker at displacement x, $K_{ms}(x)$ is a stiffness associated with the audio speaker at displacement x, and $a_2$ is a constant given by:

$$a_2 = \frac{M_{ms}F_s^2}{M_{ms}F_s^2 + R_{ms}F_s} = \frac{1}{1 + R_{ms}/(M_{ms}F_s)}$$

where $M_{ms}$ is the effective mass associated with the audio speaker, $R_{ms}$ is a mechanical resistance associated with the audio speaker, and $F_s$ is the sampling frequency at which the current is sampled.

9. An audio device comprising:
 an audio speaker configured to generate audio sounds;
 a microphone configured to capture audio sounds;
 a processing circuit coupled to the audio speaker and having a current signal input configured to receive a current signal indicative of an electrical current associated with the audio speaker and a reference signal output, wherein the processing circuit is configured to:
  calculate a predicted displacement associated with an audio speaker including a nonlinear response of the audio speaker with a mathematical model which calculates predicted displacement of the audio speaker as a function of the current signal using a time-varying difference equation, wherein coefficients of the difference equation are based on a set of physical parameters of the audio speaker;
  calculate a predicted acoustic output of the audio speaker based on the predicted displacement;
  generate a reference signal to the reference signal output, wherein the reference signal is equivalent to the predicted acoustic output of the audio speaker; and
 an acoustic echo canceller coupled to the processing circuit and configured to, based on the reference signal, cancel a portion of the audio sounds received by the microphone corresponding to echoes of the audio sounds generated by the audio speaker.

10. The audio device of claim 9, wherein the set of physical parameters includes at least one of a force factor, a mechanical stiffness, an electrical inductance, a reluctance force factor, an effective mass, and a mechanical resistance of the audio speaker.

11. The audio device of claim 9, wherein the mathematical model comprises a second-order difference equation as a function of the current signal.

12. The audio device of claim 9, wherein the difference equation is given by:

$$x(n) = \left[\frac{F_m(x(n-1))i^2(n) + Bl(x(n-1))i(n) - K_{ms}(x(n-1))x(n-1)}{M_{ms}F_s^2 + R_{ms}F_s}\right] + (1+a_2)x(n-1) - a_2 x(n-2)$$

wherein x(n) is the predicted displacement at a discrete time n, i(n) is the current at a discrete time n, $F_m(x)$ is a reluctance force factor associated with the audio speaker at displacement x, Bl(x) is a force factor associated with the audio speaker at displacement x, $K_{ms}(x)$ is a stiffness associated with the audio speaker at displacement x, and $a_2$ is a constant given by:

$$a_2 = \frac{M_{ms}F_s^2}{M_{ms}F_s^2 + R_{ms}F_s} = \frac{1}{1 + R_{ms}/(M_{ms}F_s)}$$

where $M_{ms}$ is the effective mass associated with the audio speaker, $R_{ms}$ is a mechanical resistance associated with the audio speaker, and $F_s$ is the sampling frequency at which the current is sampled.

13. An article of manufacture comprising:
a non-transitory computer readable medium; and
computer-executable instructions carried on the computer readable medium, the instructions readable by a processor, the instructions, when read and executed, for causing the processor to:
 receive a current signal indicative of an electrical current associated with an audio speaker;
 calculate a predicted displacement associated with the audio speaker including a nonlinear response of the audio speaker with a mathematical model which calculates predicted displacement of the audio speaker as a function of the current signal using a time-varying difference equation, wherein coefficients of the difference equation are based on a set of physical parameters of the audio speaker;
 calculate a predicted acoustic output of the audio speaker based on the predicted displacement; and
 generate a reference signal to an acoustic echo canceller, wherein the reference signal is equivalent to of the predicted acoustic output of the audio speaker.

14. The article of claim 13, wherein the set of physical parameters includes at least one of a force factor, a mechanical stiffness, an electrical inductance, a reluctance force factor, an effective mass, and a mechanical resistance of the audio speaker.

15. The article of claim 13, wherein the mathematical model comprises a second-order difference equation as a function of the current signal.

16. The article of claim 13, wherein the difference equation is given by:

$$x(n) = \left[\frac{F_m(x(n-1))i^2(n) + Bl(x(n-1))i(n) - K_{ms}(x(n-1))x(n-1)}{M_{ms}F_s^2 + R_{ms}F_s}\right] + (1+a_2)x(n-1) - a_2 x(n-2)$$

wherein x(n) is the predicted displacement at a discrete time n, i(n) is the current at a discrete time n, $F_m(x)$ is a reluctance force factor associated with the audio speaker at displacement x, Bl(x) is a force factor associated with the audio speaker at displacement x, $K_{ms}(x)$ is a stiffness associated with the audio speaker at displacement x, and $a_2$ is a constant given by:

$$a_2 = \frac{M_{ms}F_s^2}{M_{ms}F_s^2 + R_{ms}F_s} = \frac{1}{1 + R_{ms}/(M_{ms}F_s)}$$

where $M_{ms}$ is the effective mass associated with the audio speaker, $R_{ms}$ is a mechanical resistance associated with the audio speaker, and $F_s$ is the sampling frequency at which the current is sampled.

* * * * *